(12) United States Patent
Szedo et al.

(10) Patent No.: US 9,237,257 B1
(45) Date of Patent: Jan. 12, 2016

(54) CIRCUITS FOR AND METHODS OF GENERATING A DIGITAL IMAGE

(71) Applicant: Xilinx, Inc., San Jose, CA (US)

(72) Inventors: Gabor Szedo, Broomfield, CO (US); Vanessa Y. Chou, San Jose, CA (US)

(73) Assignee: XILINX, INC., San Jose, CA (US)

( * ) Notice: Subject to any disclaimer, the term of this patent is extended or adjusted under 35 U.S.C. 154(b) by 328 days.

(21) Appl. No.: 13/918,253

(22) Filed: Jun. 14, 2013

(51) Int. Cl.
*H04N 5/14* (2006.01)

(52) U.S. Cl.
CPC ..................... *H04N 5/142* (2013.01)

(58) Field of Classification Search
USPC .......................... 382/266, 254, 275
See application file for complete search history.

(56) References Cited

U.S. PATENT DOCUMENTS

| | | | | |
|---|---|---|---|---|
| 5,602,934 A * | 2/1997 | Li et al. | .......... | 382/128 |
| 7,355,755 B2 * | 4/2008 | Suino et al. | .......... | 358/3.15 |
| 7,515,209 B2 * | 4/2009 | Hsu | .......... | 348/606 |
| 7,844,127 B2 * | 11/2010 | Adams et al. | .......... | 382/266 |
| 8,400,533 B1 | 3/2013 | Szedo et al. | | |
| 8,441,562 B1 | 5/2013 | Szedo et al. | | |
| 8,754,988 B2 * | 6/2014 | Baker | .......... | 348/607 |
| 2007/0189630 A1 * | 8/2007 | Lei | .......... | 382/254 |
| 2008/0205787 A1 * | 8/2008 | Hsu | .......... | 382/266 |
| 2011/0157436 A1 * | 6/2011 | Yin | .......... | 348/252 |

OTHER PUBLICATIONS

Gonzales, Rafael et al., *Digital Image Processing*, 3rd Edition, Aug. 31, 2007, pp. 156-168, Chapter 3, Prentice Hall, Upper Saddle River, New Jersey, USA.

* cited by examiner

*Primary Examiner* — Ishrat I Sherali
(74) *Attorney, Agent, or Firm* — John J. King

(57) ABSTRACT

A circuit for generating a digital image is described. The circuit comprises an image capture circuit; an edge mapping circuit coupled to the image capture circuit, the edge mapping circuit generating a mapping of edges in the image; and an edge enhancement circuit coupled to the edge mapping circuit. The edge enhancement circuit modifies aberrations in the image which are associated with an edge based upon a coefficient of a plurality of directional coefficients associated with an edge. A method of generating a digital image is also described.

20 Claims, 8 Drawing Sheets

CIRCUITS FOR AND METHODS OF GENERATING A DIGITAL IMAGE

FIELD OF THE INVENTION

The present invention relates generally to integrated circuit devices, and in particular, to circuits for and methods of generating a digital image.

BACKGROUND

Receptors in the human eye are only capable of detecting light having wavelengths between approximately 400 nanometers (nm) and 700 nm. These receptors are of three different types, including receptors for red (R) light, receptors for green (G) light and receptors for blue (B) light. The representation of an image based upon the intensity of red, blue and green color components is commonly referred to as RGB. If a single wavelength of light is observed, the relative responses of these three types of receptors allow us to discern what is commonly referred to as the color of the light. This phenomenon is extremely useful in color video processing because it enables generating a range of colors by adding together various proportions of light from just three wavelengths.

An image to be displayed is broken down into an array of picture elements or pixels to be displayed. Generally, each pixel displays a proportion of red, green and blue light depending on the signals to be displayed. Many image detecting devices include a sensor which will detect only one color component for each pixel. However, when rendering a color image, the two missing color components at each pixel have to be interpolated based upon color components of other pixels. If this process is not performed appropriately, the produced image quality will be degraded by various aberrations, such as highly visible zipper effects and false color artifacts. A zipper effect refers to abrupt and unnatural changes in intensity between neighboring pixels. False color artifacts correspond to dots or streaks of colors which do not exist in the original image.

SUMMARY

A circuit for generating a digital image is described. The circuit comprises an image capture circuit; an edge mapping circuit coupled to the image capture circuit, the edge mapping circuit generating a mapping of edges in the image; and an edge enhancement circuit coupled to the edge mapping circuit, the edge enhancement circuit modifying aberrations in the image which are associated with an edge based upon a directional coefficient of a plurality of directional coefficients associated with an edge.

A circuit for generating a digital image according to another arrangement comprises an image capture circuit; an edge mapping circuit coupled to the image capture circuit, the edge mapping circuit generating a mapping of edges in the image; an edge enhancement circuit coupled to the edge mapping circuit, the edge enhancement circuit modifying aberrations in the image which are associated with an edge based upon a directional coefficient of a plurality of directional coefficients associated with an edge; and a noise reduction circuit coupled to the edge mapping circuit, the noise reduction circuit modifying aberrations in the image which are not edges.

A method of generating a digital image is also described. The method comprises capturing an image; generating a mapping of edges in the image; and modifying aberrations in the image which are associated with an edge of the mapped edges of the image based upon a coefficient of a plurality of directional coefficients associated with an edge.

DETAILED DESCRIPTION OF THE DRAWINGS

Figure 1:
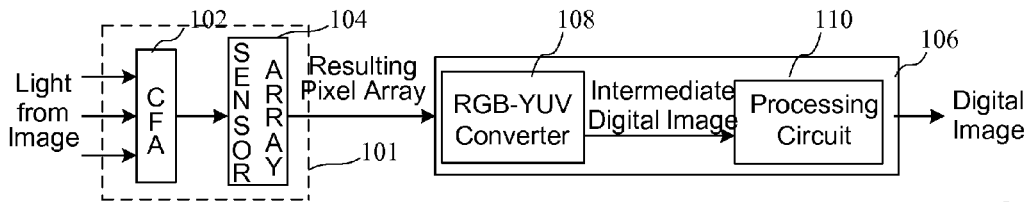
FIG. 1 is a block diagram of a circuit for reducing aberrations in a digital image.

Turning first to FIG. 1, a block diagram of a circuit for reducing aberrations in a digital image is shown. In particular, the system of FIG. 1 comprises an image detection circuit 101 having color filters 102 coupled to receive light from a scene for which a digital image is to be generated and a sensor array 104. Common color filter arrays typically include red, green, blue, or cyan, magenta, yellow, or cyan, magenta, yellow, green color filters. It should be noted that, while various embodiments described below relate to red, green, blue color filter arrays by way of example, the embodiments may also apply to 3 other color filter arrays. It should also be noted that while a three color array is described, the circuit and methods may also be applied to a four color filter array, as will be described in more detail below. An output of the color filter array 102 is provided to the sensor array 104. The sensor array 104 comprises a sensor in each block representing a pixel of a matrix to generate a resulting pixel array, as will be described in more detail in reference to FIG. 2. Common image sensors which may be implemented in the sensor array include a charge coupled device (CCD) or a complementary metal oxide semiconductor (CMOS) device.

The resulting pixel array is coupled to a processing device 106 which comprises a color conversion block 108 and a processing circuit 110. As will be described in more detail in reference to the remaining figures, the processing circuit 110 enables edge enhancement and noise reduction of the resulting pixel array. The processing device 106 may be any type of signal processing device for processing data, where the signal processing device may be implemented in a computer, for example. Further, the processing device may be implemented in a single integrated circuit device, or a plurality of integrated circuit devices. One type of integrated circuit device which may be used to implement the circuits and methods of reducing aberrations in a digital image may be a device having programmable resources, such as the device described in more detail in reference to FIGS. 11 and 12.

Figure 2:
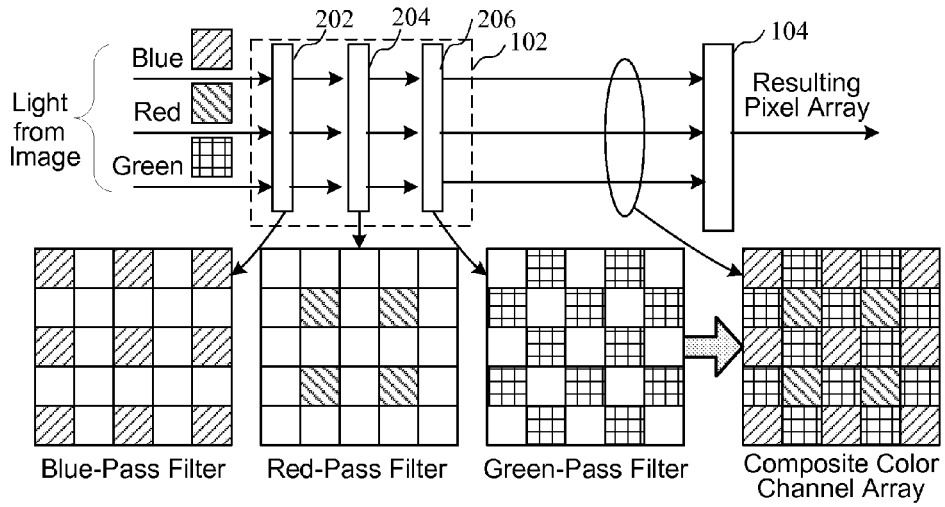
FIG. 2 is a diagram showing the generation of a pixel array.

Many digital imaging devices, such digital still cameras, acquire imagery using an image sensor overlaid with a color filter array as shown in FIG. 2, such that each sensor pixel of the image sensor samples only one of the three primary colors red, green and blue, or cyan, magenta, yellow and optionally green for example. As shown in FIG. 2, the color filters 102 may comprise a plurality of filters 202-206 for creating a composite color channel array detected by the 2-dimensional sensor array 104. According to the example of FIG. 2, a first filter 202 comprises a blue-pass filter. That is, only frequencies of light corresponding to the color blue will be passed in the boxes designated by a forward slash pattern. The other boxes (shown with no pattern) will pass all of the frequencies of light from the image which are incident at the location of the other boxes. Similarly, a second filter 204 comprises a red-pass filter which will only enable frequencies of light corresponding to the color red to pass in the boxes designated by a backward slash pattern. Finally, a third filter 206 having a green-pass filter will only enable the frequencies of light corresponding to the color green to pass in the boxes designated by a cross-hatch pattern. The light from an image is sampled and the composite of the filters 202-206 provides color channels representing intensity values to achieve the composite color channel array as is shown in FIG. 2. That is, the composite of the three filters 202-206 will allow only one color to pass in each box of the matrix. Accordingly, the resulting pixel array, also commonly referred to as a color filter array (CFA) sub-sampled image, detected by the sensor array 104 comprises a matrix associated with the image, where each pixel of the matrix is represented only by a single color component. The particular arrangement of color components as shown in FIG. 2 is the commonly referred to as a Bayer CFA pattern.

As will be described in more detail below, the intensity values of the two missing color components at each pixel must be interpolated from known intensity values in neighboring pixels to render a complete multi-color image from the resulting pixel array. This process, commonly referred to as demosaicking, is one of the critical tasks in digital image processing. If demosaicking is not performed appropriately, the produced image quality will be degraded by highly visible zipper effects and false color artifacts. While false color artifacts may appear anywhere on an image, zipper effects may appear in either a vertical orientation or a horizontal orientation. Both aberrations are due to aliasing, the fact that sample positions of sub-sampled color channels are offset spatially, and high contrast edges lying between the sampling positions that may affect color components used in the interpolation process differently.

While a 5×5 matrix is preferably used to calculate weights and interpolate values for missing color components in a given pixel, it should be understood that methods may be adapted to be performed on a larger matrix than a 5×5 matrix, and the overall image comprises many more pixels than the 5×5 array of pixels. While references are made to single images which are generated, it should be understood that the light from an image may be sampled at a given frequency, where the sampled data may be processed to generate video data.

As the human eye is at least twice as sensitive to green light than to blue or red light, the green color channel is sampled with twice the frequency of the blue and red color channels. In the Bayer CFA pattern shown in FIG. 2, green samples are located on a quincunx lattice, while red and blue samples are obtained on rectangular lattices. That is, the green samples are obtained in every other pixel in each row and column, where the rows and columns are staggered to form a checker-based pattern. The red and blue samples are obtained in every other pixel (not having a green sample) in every other row and column, with the red and blue color components in alternating rows and columns. Therefore, the interpolation of the green color component for a given pixel which does not have a green color component usually differs from the interpolation of red and blue color components.

The purpose of interpolation is to find missing color components for a given pixel. Numerous techniques have been developed for CFA interpolation. These techniques offer a wide range of tradeoffs between the complexity and the quality of results. The complexity is often measured as instructions per pixel or some function of silicon real estate, such as gate counts. The quality of results is predominantly measured as a Signal-to-Noise Ratio (SNR) or a Peak Signal-to-Noise Ratio. However, conventional methods either lead to significant aberrations in the digital image or require significant processing capacity to perform the interpolation. This significant processing capacity required may limit the devices in which the methods may be implemented or increase the cost of implementing the methods. De-focused or imperfect lenses in an optical system, low-light exposure, and quick motion can lead to blurred, noisy images or video streams. In a digital camera, cell-phone, security camera or studio recording environment the captured images and video stream may be enhanced to improve visual quality. This enhancement process involves noise reduction and edge enhancement.

Typically, outputs of edge enhancing operators such as Sobel and Laplacian operators, are blended with, or superimposed on top of, the source image. However, as both operator types are essentially high-pass filters and are therefore sensitive to noise, it is a real challenge to control the blending factors of the different filters. Similarly, low-pass filtering applied on flat regions suppresses noise, but also blurs details when applied on regions with native high-frequency content. The real time adjustment of blending factors involves problems of enabling edge enhancement filters only around edges, and enabling noise suppression only on non-structured, flat areas of the image. Such real time adjustments reduce or control dynamic temporal artifacts, such as flickering, which may appear in video sequences due to adaptive filtering, and reduce or control spatial artifacts, such as perceptible changes in noise variance across the image which may appear in video sequences due to adaptive filtering. The circuits and methods set forth below dynamically control blending based on image content, and apply novel post-processing spatial filters to remove possible artifacts introduced by sharpening and edge enhancement.

Figure 3:
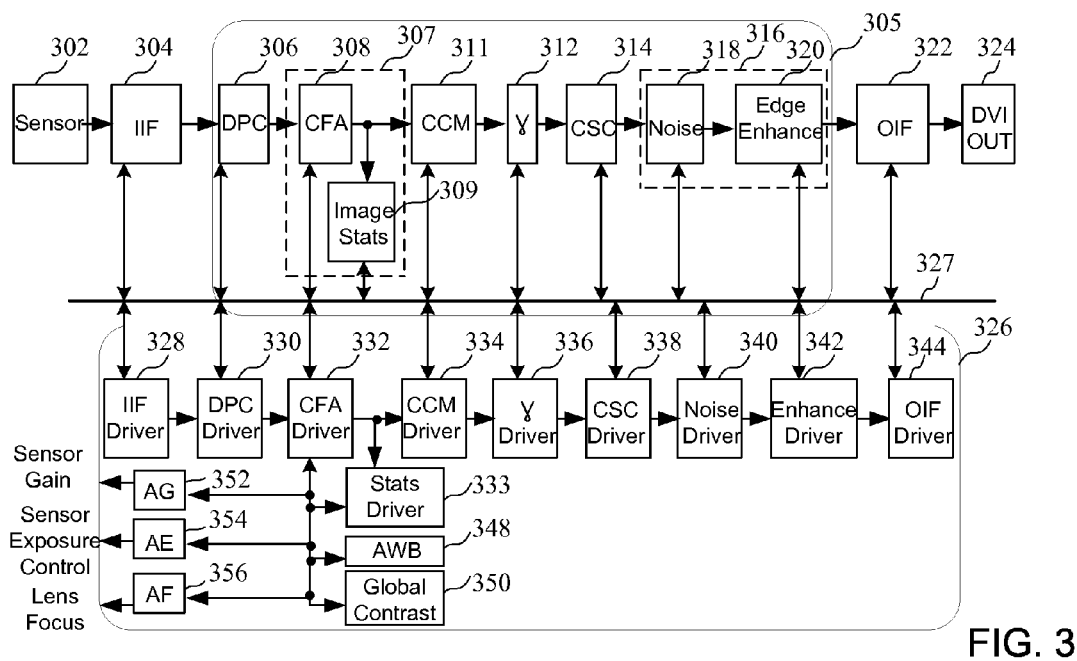
FIG. 3 is a block diagram of a circuit enabling adaptive filtering.

Turning now to FIG. 3, a block diagram of a circuit enabling adaptive filtering is shown. A sensor 302 is coupled to detect light from an image, and could be for example the image capture circuit 101. A resulting pixel array is coupled to an input interface (IIF) 304. The input interface could be an AXI4-S interface, for example. An image processing circuit 305 comprises a defective pixel correction (DPC) block 306, the output of which is coupled to an image conversion circuit 307 comprising a CFA conversion circuit 308 and an image statistics block 309 which stores an output of the CFA conversion circuit 308. The DPC block corrects any errors in the image, such as when a particular sensor may be repeatedly generating the same intensity value, for example. The color filter array conversion circuit converts the detected input intensity value to an RGB value. That is, the output of the sensor comprises an intensity value associated with a single color, for example red, green or blue, where the other colors are interpolated based upon the detected colors. An example of a method of interpolating missing colors in an array may be found in U.S. Pat. No. 8,400,533, which is incorporated by reference in this application in its entirety.

A color correction matrix (CCM) circuit 310 detects changes in color, and provides what is normally known as color casting. When light from an image is detected, such as by an incandescent or fluorescent light, or by light in the late afternoon causing red hues, the RBG spectrum may be offset. The CCM circuit 310 provides color balancing to convert the external light to white. A gamma correction circuit 312 receives the output of the CCM circuit, and compensates for the non-linearity of a display. Because perceived intensity of an image is non-linear, the gamma correction circuit 312 provides an offset to compensate for the non-linearity, which typically relates to intensity. The output of the gamma correction circuit 312 is coupled to a color space converter (CSC) circuit 314, which converts the RGB signal to a YCrCb signal, which is the actual data associated with a YUV signal as described above. The YCrCb signal is coupled to a CFA enhancement circuit 316 comprising a noise reduction block 318 and an edge enhancement block 320. The CFA enhancement circuit 316 will be described in more detail in reference to FIGS. 4 and 5. An output of the CFA enhancement circuit 316 is provided as an image to an output device 324 by way of an output interface 322.

Various software components 326 also enable the operation of the circuit blocks of FIG. 3 by way of a bus 327. In particular, IIF driver 328, DPC driver 330, CFA driver 332, a Stats driver 333, CCM driver 334, Gamma driver 336, CSC driver 338, Noise driver 340, Enhance driver 342, and OIF driver 334 enable the operation of corresponding circuit elements set forth above. Other software elements include an auto white balancing (AWB) module 348 which enables white objects to appear white, and a global contrast module 350 which is applied to an entire picture to provide appropriate luminance adjustment. Blocks 352, 354 and 356 enable generating sensor gain, sensor exposure control and lens focus elements, respectively.

Figure 4:
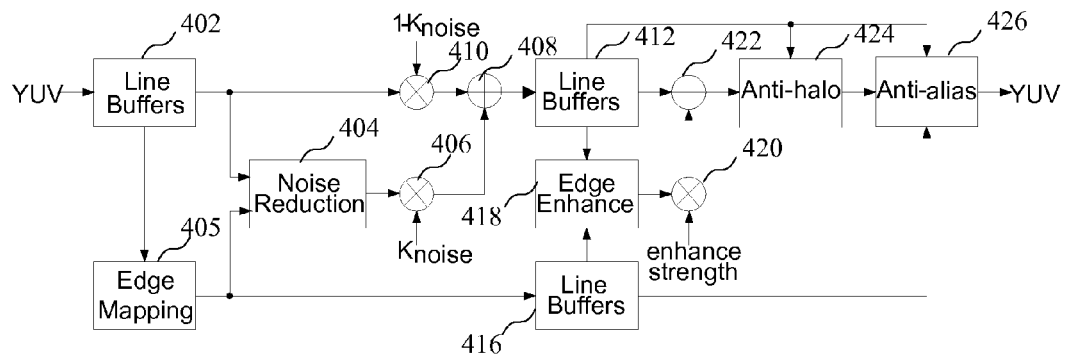
FIG. 4 is a bock diagram of a circuit enabling the generation of a digital image.
Figure 5:
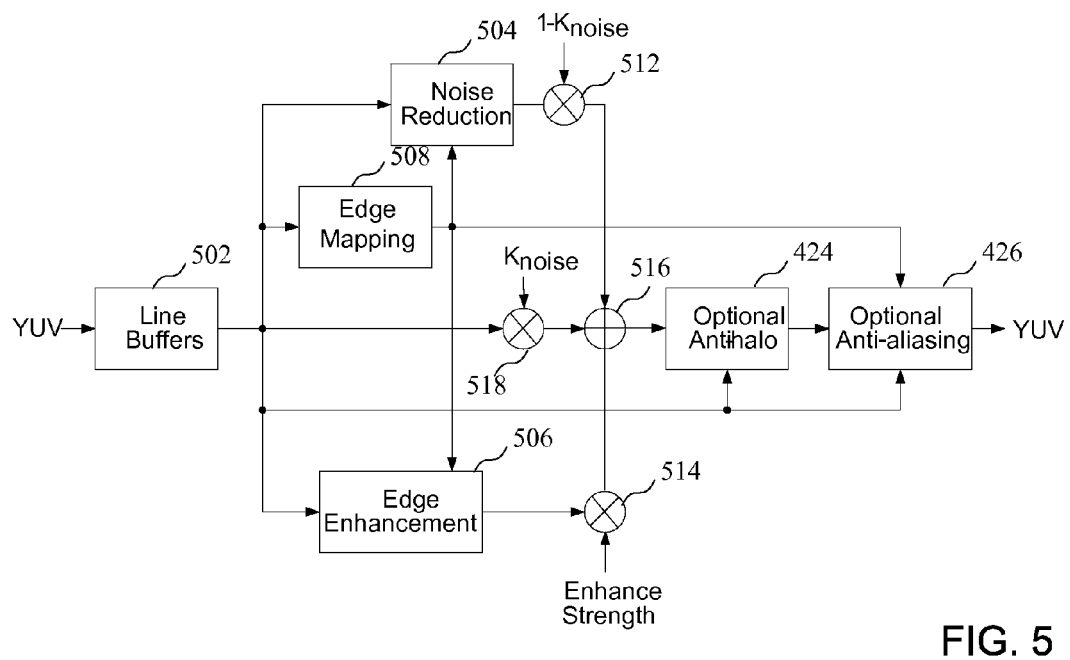
FIG. 5 is a block diagram of another circuit enabling the generation of a digital image.

FIGS. 4 and 5 are circuit arrangements which enable generating a digital image, and may be implemented in embedded systems, application specific standard products (ASSPs), application specific integrated circuits (ASICs), or field programmable gate arrays (FPGAs) for example. Also, both circuit arrangements can process streaming video without having access to multiple frames, or a frame buffer. Each circuit calculates an edge map, which controls the strength and direction of edge enhancement and/or noise reduction that is applied on the image. The circuits of FIGS. 4 and 5 may be implemented by the CFA enhancement circuit 316, for example. After applying Gaussian low-pass filters for noise reduction and Sobel and/or Laplacian high-pass filters for edge enhancement, combined results are fed to two optional modules. In particular, an optional anti-halo module reduces the ringing or overshoot effect of high-pass filters, while an optional anti-alias module reduces aliasing artifacts which can appear when edge-enhancement is performed along with clipping/clamping.

The first step for generating a digital image according to the various circuits and methods set forth below is building a coherent edge map of the image. Edge information is used to set the strength and direction of the Laplacian, Sobel and Gaussian kernels, which will be described in more detail below. An edge map calculation takes place in two steps. Two dimensional FIR filters are used with 5×5 kernels to extract edge content in four directions: horizontally, vertically and along both diagonals, which are designated as "left diagonal" and "right diagonal." Using elongated, perpendicular structural elements and morphological processing, edge content is analyzed to provide a smooth, non-ambiguous map of local edge directionality.

A second step of generating a digital image is to provide a cleaner definition of the edges in each direction, and to suppress noise on edges. For example, a true horizontal edge will not have a vertical component. However, a single pixel outlier speck of noise will affect vertical, horizontal and diagonal filter outputs. When analyzing vertical, horizontal and diagonal edge results, the pixel outlier speck should be revealed to be non-direction specific and removed from the edge map. Circuits for enhancing an edge will be described in more detail in reference to FIG. 7, while reducing or eliminating noise will be described in more detail in reference to FIGS. 8 and 9.

Turning first to FIG. 4, a block diagram of a circuit enabling the generation of a digital image is shown. In particular, line buffers 402 are coupled to receive the YUV input. An output of the line buffers 402 is coupled to a noise reduction circuit 404 which is also coupled to receive an edge map of an edge mapping circuit 405. As will be described in more detail below in reference to FIGS. 8 and 9, the noise reduction circuit enables reducing aberrations in the image. An output of the noise reduction circuit is coupled to a multiplier 406 which also receives a noise coefficient $K_{noise}$, which will be described in more detail in reference to FIG. 8 An adder 408 is coupled to receive an output of the multiplier 406 and a second multiplier 410 which generates an output based upon an output of the liner buffers 402 and a value of $(1-K_{noise})$. The output of the adder 408 is coupled to line buffers 412. The outputs of the line buffers 412 and line buffers 416 which store edge maps generated by the edge mapping circuit 405 are coupled to an edge enhancement circuit 418. As will be described in more detail below in reference to FIG. 7, the edge enhancement circuit 418 enables improving images at edges of the image. An output of the edge enhancement circuit 418 and an enhance strength value 420 are coupled to a multiplier 420, the output of which is coupled to an adder 422. Accordingly, the adder 422 adds outputs associated with noise reduction and edge enhancement to generate an output signal. The output is coupled to an optional anti-halo circuit 424 and an optional anti-aliasing circuit 426, the output of which is an improved YUV signal.

Turning now to FIG. 5, a block diagram of another circuit enabling the generation of a digital image is shown. While the circuit arrangement of FIG. 4 provides high visual quality, the circuit arrangement of FIG. 4 also requires a large number of line buffers. The number of required line buffers can be reduced by providing a parallel circuit arrangement as shown in the embodiment of FIG. 5. In particular, the YUV signal stored by the line buffers 502 is coupled to a noise reduction circuit 504, an edge enhancement circuit 506, and an edge mapping circuit 508. An output of the edge mapping circuit 508 is provided to the noise reduction circuit 504 and the edge enhancement circuit 506. A multiplier 512 is coupled to receive the output of the noise reduction circuit 504 and a value $1-k_{noise}$. A second multiplier 514 is coupled to receive the output of an edge enhancement circuit 508 and an enhance strength value. An adder circuit 516 is coupled to receive an output of the multiplier 512, the multiplier 514, and a multiplier 518 which is also coupled to receive the output of the line buffers 502 and the $k_{noise}$ value. An output of the adder circuit 516 is coupled to the anti-halo circuit 424 and the anti-aliasing circuit 426.

Figure 6:
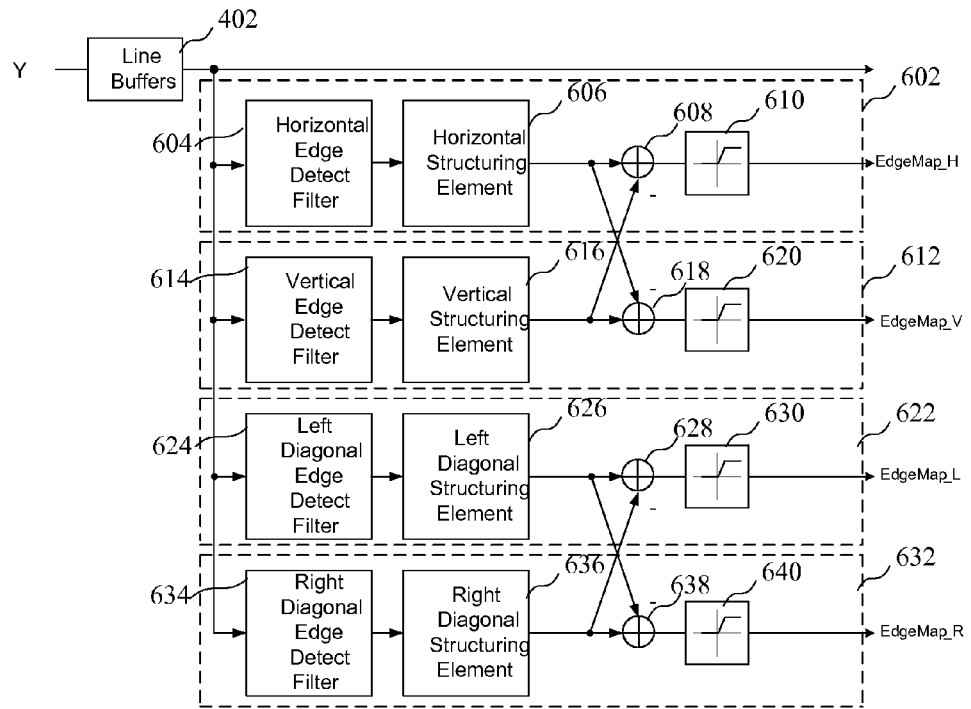
FIG. 6 is a block diagram of an edge map module which could be implemented in FIGS. 4 and 5.

Turning now to FIG. 6, a block diagram of an edge mapping circuit which could be implemented in FIGS. 4 and 5 is shown. The output of the line buffers 402 is coupled to a horizontal processing block 602 having a horizontal edge detect filter 604, the output of which is coupled to a horizontal structuring element 606. A detection filter is used to determine whether an edge exists, where a corresponding structuring element is used to emphasize the edge. An adder circuit 608 is coupled to receive an output of the horizontal structuring element 606 and generate an output EdgeMap_H at a decision block 610. The adder circuit 608 is also coupled to receive an output of a vertical processing block 612. The output of the line buffers 402 is also coupled to the vertical processing block 612 having a vertical edge detect filter 614, the output of which is coupled to a vertical structuring element 616. An adder circuit 618 is coupled to receive an output of the vertical structuring element 616 and generate an output EdgeMap_V at a decision block 620. The adder circuit 618 is also coupled to receive an output of the horizontal structuring element 606. Accordingly, the adder 608 of the horizontal processing block is coupled to receive an output of the vertical structuring element 616, and the adder 618 of the vertical processing block 612 is coupled to receive an output of the horizontal structuring element 606 of the horizontal processing block 602 as shown. By subtracting a vertical value from a horizontal value (and vice versa) and subtracting a left diagonal value from a right diagonal value (and vice versa), it can be determined whether an aberration is an isolated dot of noise rather than an edge. That is, if a value of a particular pixel appears in the output of both horizontal and vertical filters (or both left and right diagonals), it is more likely that the pixel is an aberration, and not a part of an edge. Therefore, the EdgeMap_H and EdgeMap_V values in the case of detecting vertical or horizontal edges (or EgdeMap_L and EdgeMap_R values in the case of detecting diagonal edges) will be zero, indicating that the value associated with the pixel is a dot of noise and not an edge.

The output of the line buffers 402 is coupled to the left diagonal processing block 622 having a left diagonal edge detect filter 624, the output of which is coupled to a left diagonal structuring element 626. An adder circuit 628 is coupled to receive an output of the left diagonal structuring element 626 and generate an output at a decision block 630. The adder circuit 628 is also coupled to receive an output of a right diagonal filter block. The output of the line buffers 402 is coupled to a right diagonal processing block 632 having a right diagonal edge detect filter 634, the output of which is coupled to a right diagonal structuring element 636. An adder circuit 638 is coupled to receive an output of the right diagonal structuring element 636 and generate an output at a decision block 640. The adder circuit 638 is also coupled to receive an output of the left diagonal processing block 622. Accordingly, the adder 638 of the left diagonal processing block is coupled to receive an output of the right diagonal structuring element 626, and the adder 638 of the right diagonal processing block 632 is coupled to receive an output of the left diagonal structuring element 626 of left diagonal processing block 622 as shown. The decision blocks 610, 620, 630, and 640 generate, for each of the four directions, a directional luminance value which may be an integer value. While the detect filters and the structuring elements of FIG. 6 are shown as separate elements, it should be understood that they could be implemented as single elements.

As is apparent in FIG. 6, only the intensity of the image (i.e., the y value) is used to determine an edge, and is therefore shown as the only input to the line buffers 402. Further, while edge determination and edge enhancement only require intensity values for an image, noise reduction involves the modification of both intensity and color (i.e., Cr and Cb) values to provide appropriate blurring in the image, as will be described in more detail below. It should be noted that during edge mapping described in FIG. 6, as well as during edge enhancement described in FIG. 7 and noise reduction described in FIGS. 8 and 9, each pixel is analyzed as a center pixel in a 5×5 pixel array, where coefficients associated with a plurality of directions are generated based upon the pixels of the array.

Figure 7:
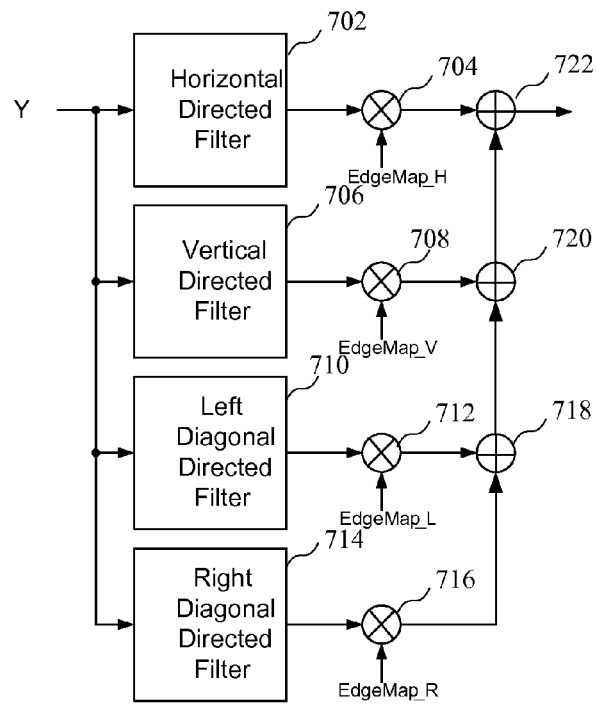
FIG. 7 is a block diagram of an edge enhancement module which could be implemented in FIGS. 4 and 5.

The outputs of the edge mapping circuit are used by the edge enhancement circuits of FIGS. 4 and 5, and described in more detail in reference to FIG. 7, where the edge enhancement circuit uses direction specific filters to enhance image edges.

Based upon a series of empirical tests, the following filter bank proved most efficient in detecting contiguous edges around the central pixel:

$$\frac{1}{16}\begin{matrix} -1 & -2 & -2 & -2 & -1 \\ -1 & -2 & -2 & -2 & -1 \\ 0 & 0 & 0 & 0 & 0 \\ 1 & 2 & 2 & 2 & 1 \\ 1 & 2 & 2 & 2 & 1 \end{matrix} \quad \frac{1}{16}\begin{matrix} 2 & -2 & -1 & -1 & 0 \\ -2 & -2 & -2 & 0 & 1 \\ -1 & -2 & 0 & 2 & 1 \\ -1 & 0 & 2 & 2 & 2 \\ 0 & 1 & 1 & 2 & 2 \end{matrix}$$

EXAMPLE 1

Horizontal and Diagonal Filter Kernels

By using negative coefficients and opposite coefficients on opposite sides of a given direction represented by zero coefficients, the contrast in the intensity of pixels at the edge is more clear. The Vertical Edge filter kernel is a 90 degree rotation of the Horizontal Edge filter kernel, and the Right Diagonal Edge filter is a 90 degree rotation of the Left Diagonal Edge Filter kernel.

The second step of generating the edge map is to use structural elements to resolve ambiguities stemming from multiple edge detectors returning strong edge content/presence at the same pixel neighborhood. Structuring elements aligned with edge detector directions are used to reinforce nearby, aligned edge fragments. Mathematical morphology in image processing and analysis usually involves non-linear operations such as erosion, dilation, opening and closing. Morphological operators are useful to find or eliminate certain image features, objects smaller than a specified size, contiguous line segments, etc. Structuring elements are particular cases of binary images, usually small and simple, used to probe or interact with a given image, with the purpose of drawing conclusions on how this shape fits or misses the shapes in the image.

The results from perpendicular directions are subtracted, e.g., the horizontal edge content suppressing vertical edge content and vice versa, where hysteresis may be applied during subtraction. For example, a multiple of the horizontal edge content may be subtracted from the vertical edge content and vice-versa. Finally, results are deeply quantized, applying a strong non-linear decision resulting in either one or none of the perpendicular directions to be kept. This way, the elongated structural elements reinforce continuous, or fragmented edges, but are immune to noise, fine detail or texture.

$$\begin{matrix} 0 & 0 & 0 & 0 \\ 1 & 1 & 1 & 1 \\ 1 & 1 & 1 & 1 \\ 0 & 0 & 0 & 0 \end{matrix}$$

EXAMPLE 2

Example Coefficients for the Horizontal Structural Element Used

Specific examples of circuits providing noise reduction and edge enhancement are now provided. Turning first to FIG. 7, a block diagram of an edge enhancement module which could be implemented with the circuit of FIG. 6 in FIGS. 4 and 5. That is, outputs generated in FIG. 6 are used with filter stages of FIG. 7. Combining the directed operators, such as Laplacian operators, using the edge content information as weights creates an edge enhancement operator which is oriented to be directly perpendicular to the edge, resulting in optimal use of the kernel size and minimizing noise amplification. The Luminance value Y for the pixel is coupled to a horizontal directed filter 702, an output of which is coupled to a multiplier 704, which is also coupled to receive the EdgeMap_H value. The Luminance value Y for the pixel is also coupled to a vertical directed filter 706, an output of which is coupled to a multiplier 708, which is also coupled to receive the EdgeMap_L value. The Luminance value Y for the pixel is further coupled to a left diagonal directed filter 710, an output of which is coupled to a multiplier 712, which is also coupled to receive the EdgeMap_L value. Then finally, the Luminance value Y for the pixel is coupled to a right diagonal directed filter 714, an output of which is coupled to a multiplier 716, which is also coupled to receive the EdgeMap_R value. The outputs of the multiplier circuits are also coupled to adder circuits. The outputs of the multiplier 712 and 716 are coupled to an adder 718. An output of the multiplier 708 and an output of the adder 718 are coupled to an adder 720. An output of the multiplier 704 and an output of the adder 720 are coupled to an adder 722. Accordingly, depending upon which edge map values of the plurality of values generated in FIG. 6 indicates that a pixel is associated with one or more edges, the output of the adder circuit 722 represents an enhanced luminance value Y for the pixel. That is, based upon an output of the directed filter, such as a Laplacian filter, and one or more corresponding values generated by the edge mapping circuit, an enhanced Luminance value is generated.

For FPGA and ASIC implementations, the typical enhancement operation is based on convolving the image with a small, separable, and integer valued filter in horizontal, vertical and diagonal directions and is therefore relatively inexpensive in terms of computations. In the examples below, only the integer valued kernels are presented. Typically filter outputs are normalized before further processing. Normalization can also take place during subsequent blending.

Laplacian operators have been used extensively for enhancing detail in images. The omnidirectional operator can be used to enhance edges irrespective of edge direction, while direction specific one dimensional Laplacians can be used, such as in the directed filters of FIG. 7, to enhance detail in a specific direction, as shown in the example of FIG. 4.

$$\begin{matrix} 0 & -1 & 0 \\ -1 & 4 & -1 \\ 0 & -1 & 0 \end{matrix} \quad \begin{matrix} 0 & 0 & 0 \\ -1 & 2 & -1 \\ 0 & 0 & 0 \end{matrix} \quad \begin{matrix} 0 & 0 & -1 \\ 0 & 2 & 0 \\ -1 & 0 & 0 \end{matrix}$$

EXAMPLE 3

Uniform-, Horizontal-, and Diagonal Laplacian Operators

The Sobel operator has been used in image processing and video technology to detect or enhance edges. It is a discrete differentiation operator, computing an approximation of the gradient of the image intensity function. At each point in the image, the result of the Sobel operator is either the corresponding gradient vector or the norm of this vector.

$$\begin{matrix} +1 & 0 & -1 \\ +2 & 0 & -2 \\ +1 & 0 & -1 \end{matrix} \quad \begin{matrix} +1 & +2 & +1 \\ 0 & 0 & 0 \\ -1 & -2 & -1 \end{matrix} \quad \begin{matrix} 0 & 1 & 2 \\ -1 & 0 & 1 \\ -2 & -1 & 0 \end{matrix}$$

EXAMPLE 4

Vertical-, Horizontal-, and Diagonal Sobel Operators

Discrete, quantized Gaussian operators have also been used in image and video processing algorithms for blurring, noise suppression and feature extraction. Gaussian operators are generally one or two-dimensional low-pass filters which suppress noise, but also blur details by suppressing the native high-frequency content of images.

$$\begin{matrix} 1 & 2 & 1 \\ 2 & 4 & 2 \\ 1 & 2 & 1 \end{matrix} \quad \begin{matrix} 0 & 0 & 0 \\ 1 & 2 & 1 \\ 0 & 0 & 0 \end{matrix} \quad \begin{matrix} 0 & 0 & 1 \\ 0 & 2 & 0 \\ 1 & 0 & 0 \end{matrix}$$

EXAMPLE 5

Uniform-, Horizontal-, and Diagonal Gaussian Operators

Similar to the edge enhancement circuit, the noise reduction circuit constructs a pixel specific blurring kernel to perform adaptive filtering on specific neighborhoods. According to one implementation, the kernel is constructed using Gaussian-like directional low-pass filters. However, in order to allow implementation without using multipliers for normalization, a slight modification is implemented to ensure the sum of coefficients add up to a power of 2, allowing simple scaling for normalization.

$$\frac{1}{8}\begin{matrix} 0 & 0 & 0 & 0 & 0 \\ 0 & 0 & 0 & 0 & 0 \\ 1 & 2 & 2 & 2 & 1 \\ 0 & 0 & 0 & 0 & 0 \\ 0 & 0 & 0 & 0 & 0 \end{matrix} \quad \frac{1}{8}\begin{matrix} 0 & 0 & 0 & 0 & 1 \\ 0 & 0 & 0 & 2 & 0 \\ 0 & 0 & 2 & 0 & 0 \\ 0 & 2 & 0 & 0 & 0 \\ 1 & 0 & 0 & 0 & 0 \end{matrix}$$

EXAMPLE 6

Horizontal and Diagonal Filter Kernels

The weights used for the linear combination of different blurring kernels are set by analyzing the local luminance variance present in the image. Instead of using variance, which would require squaring kernel contents, a "pseudo variance" is determined based upon a sum of absolute differences between kernel contents and the kernel averages. The filters can also be used to calculate the average of the 5×5 kernel. To calculate the pseudo variance, the absolute value of the difference between each pixel in the 5×5 kernel and the average of the 5×5 kernel (which is the output of the filter) is taken.

Figure 8:
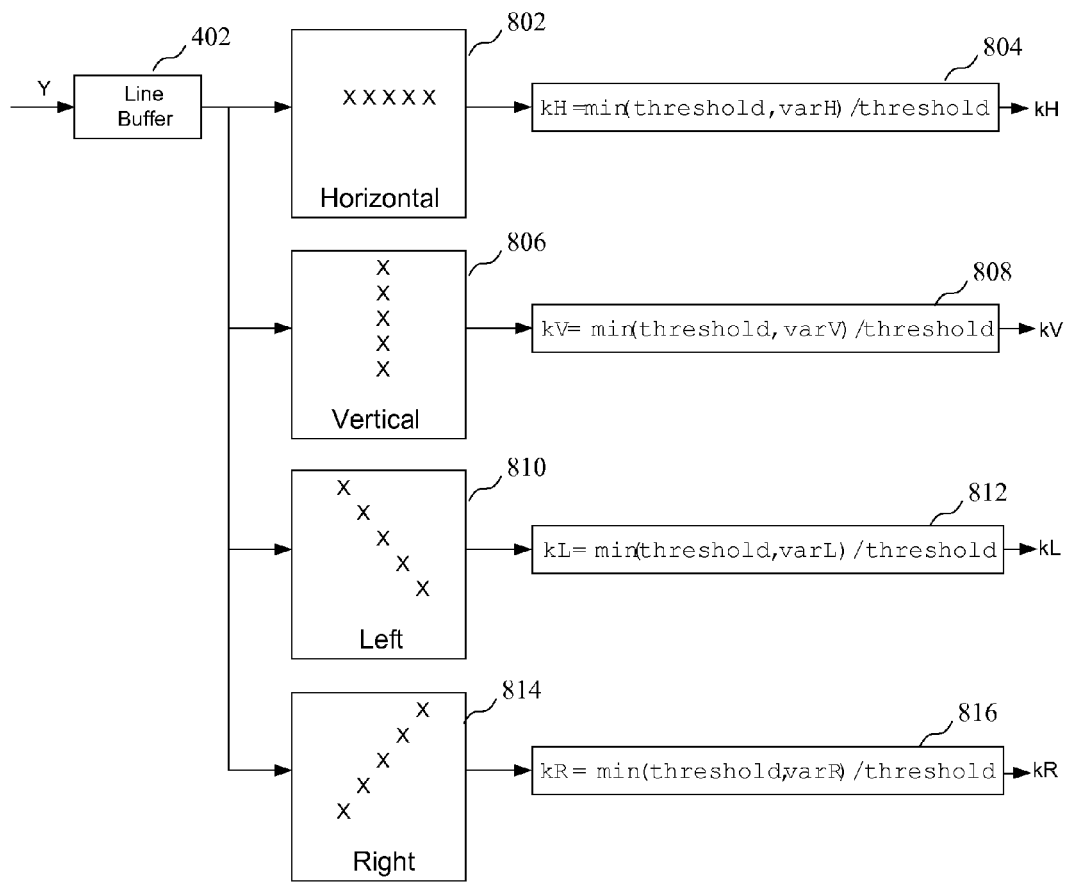
FIG. 8 is a block diagram of a coefficient generator of a noise reduction circuit enabling local directional variance calculation which may be implemented in FIGS. 5 and 6.

Turning now to FIG. 8, a block diagram of a coefficient generator of a noise reduction circuit enabling local directional variance calculation which may be implemented in FIGS. 5 and 6 is shown. In particular, the line buffer 402 is also coupled to a horizontal filter 802, the output of which is coupled to a coefficient generator 804 which generates a horizontal coefficient $k_H$. The line buffer 402 is coupled to a vertical filter 806, the output of which is coupled to a coefficient generator 808 which generates a vertical coefficient $k_V$. The line buffer 402 is further coupled to a left direction filter 810, the output of which is coupled to a coefficient generator 812 which generates a left directional coefficient $k_L$. Finally, the line buffer 402 is coupled to a horizontal filter 814, the output of which is coupled to a coefficient generator 816 which generates a right directional coefficient $k_R$. The coefficient generators of FIG. 8 calculate, for each pixel based upon a 5×5 matrix for example, a variance. If a calculated variance is above a predetermined threshold, the pixel is most likely associated with an edge and not noise. The coefficients are calculated using the pseudo-variance and the threshold. For example, the average of the 5 pixels generated by the horizontal filter 802 is determined, and the coefficient generator 804 determines a horizontal coefficient $k_H$ is generated based upon the threshold and the pseudo variance. If the pseudo variance is above the threshold, then the coefficient k is equal to 1. If the variance is below the threshold, then the coefficient k is equal to the pseudo variance divided by the threshold. The coefficients generated in FIG. 8 will be used with the blurring filters of FIG. 9.

Figure 9:
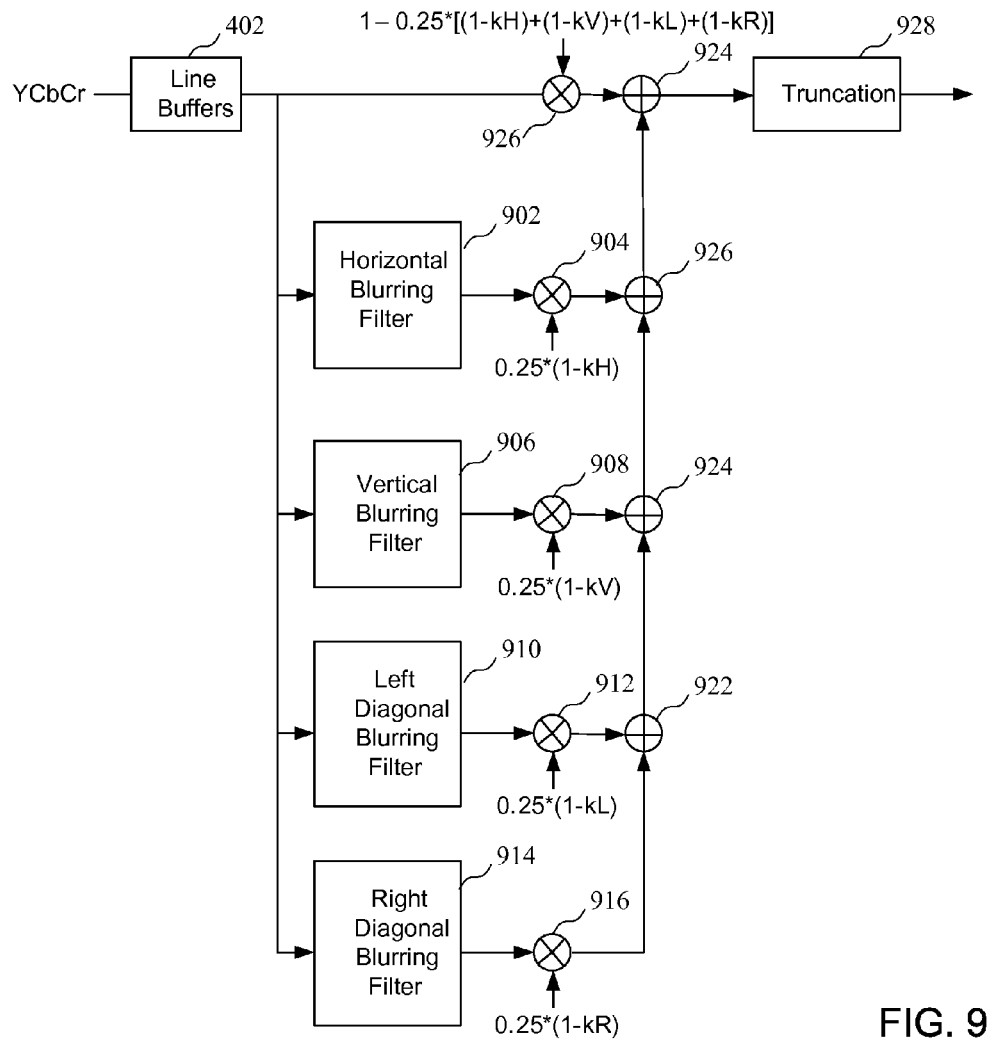
FIG. 9 is a block diagram of a circuit of a noise reduction circuit which may receive coefficients generated by the coefficient generator of FIG. 8.

Blurring is a technique which alters both intensity and color (i.e., luminance and chrominance values) to enable aberrations to better blend in with surrounding pixels. By way of example, if noise comprising a red dot is found in a region represented by a gray sky, both the intensity and color of the red dot would be altered based upon the color and intensity of adjacent pixels (e.g., pixels of a 5×5 matrix). As shown in the circuit of FIG. 9 which enables blurring, an output of the line buffers 402 is coupled to a plurality blurring filters. In particular, a horizontal blurring filter 902 generates a filter output which is coupled to a multiplier 904 which also receives a factor 0.25(1−$k_H$). A vertical blurring filter 906 generates a filter output which is coupled to a multiplier 908 which also receives a factor 0.25(1−$k_V$). A left diagonal blurring filter 910 generates a filter output which is coupled to a multiplier 912 which also receives a factor 0.25(1−$k_L$). A right diagonal blurring filter 914 generates a filter output which is coupled to a multiplier 916 which also receives a factor 0.25(1−$k_H$). The outputs of the multiplier circuits are also coupled to adder circuits. The outputs of the multiplier 912 and 916 are coupled to an adder 922. An output of the multiplier 908 and an output of the adder 922 are coupled to an adder 924. An output of the multiplier 904 and an output of the adder 920 are coupled to an adder 926.

While blurring is performed across the entire image, blurring is not performed across an edge. That is, blurring across an edge would reduce the contrast of the edge. The pixels are processed on a pixel-by-pixel basis (as the center pixel of a matrix), where the directional coefficients generated by the coefficient generator of FIG. 8 will prevent blurring across an edge. By way of example, if the horizontal coefficient $k_H$ is large (e.g., approaching 1 which would indicate that the pixel is associated with a horizontal edge), the multiplier 0.25*(1−kH) would be small, reducing the horizontal blurring component provided by the horizontal blurring filter and adder 926. Also, the multiplier 1−0.25[(1−kH)+(1−kV)+(1−kL)+(1−kR) would not be reduced by as much, enabling a greater component to be passed to the adder 924. As shown in FIG. 9, the directional blurring circuit modifies both the luminance and chrominance circuits.

Referring back to FIGS. 4 and 5, an additional anti-halo processing step can be implemented to prevent overshoot and undershoot at enhanced edges. During this step each enhanced pixel value is compared to the corresponding pixel and its neighborhood of the original image. The edge enhanced pixel value is clipped at the maximum pixel value of its 8 nearest neighbors from the original frame. Similarly, each enhanced pixel value is clamped at the minimum pixel value of its 8 nearest neighbors of the original image. Denoting $O_{x,y}$ as a pixel value of the original image and $P_{x,y}$ as a pixel value of the processed image, and given a two-dimensional kernel sized n×n (n=2k+1) in the central portion of the image, $$P'_{x,y} = \max\left\{\min\left[\left(\max_{-k\leq i,j\leq k} O_{x+i,y+j}\right), P_{x,y}\right], (\min_{-k\leq i,j\leq k} O_{x+i,y+j})\right\}$$

In addition to reducing overshoot and undershoot artifacts, the anti-halo circuit 424 also measures the amount of clipping and clamping that was applied on the entire image. This information, coupled with minimum and maximum values, variance, and edge content can be used in higher level application software to adaptively control the edge enhancement gain on a per frame basis.

When enhancing already sharp edges running at a low angle in reference to the sampling grid, edge enhancement may introduce aliasing artifacts due to saturation at the extremes of the dynamic range permitted by the pixel data representation. Similar to adaptive edge enhancement, edge adaptive low-pass filters are used to reduce the aliasing artifacts introduced. The anti-aliasing filters are only applied along the edges so as not to blur the edge, and use the same edge map information used for the Laplacian operators for edge enhancement. Another beneficial effect of anti-aliasing is to reduce noise around edges. Typically, these are the locations where the noise reduction stage turns off filtering. Without the anti-aliasing stage, which smears around object contours, noise variance will be visibly higher around object edges in static video scenes.

Figure 10:
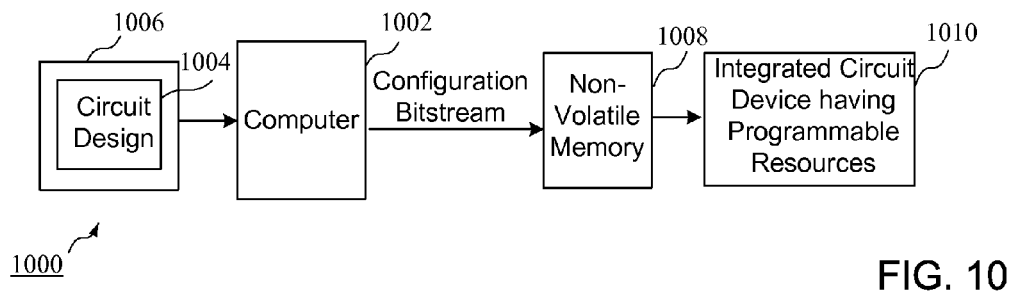
FIG. 10 is a block diagram of a system for programming a device having programmable resources.

Turning now to FIG. 10, a block diagram of a system for programming a device having programmable resources according to an embodiment is shown. In particular, a computer 1002 is coupled to receive a circuit design 1004 from a memory 1006, and generates a configuration bitstream which is stored in the non-volatile memory 1006. As will be described in more detail below, the circuit design may be a high level design, such as a circuit design defined in a hardware description language (HDL). Also, the computer may be configured to run software that generates a configuration bitstream which is stored in the non-volatile memory 1008 and provided to an integrated circuit 1010 which may be a programmable integrated circuit, such as the integrated circuit described below in FIG. 10. As will be described in more detail below, bits of the configuration bitstream are used to configure programmable resources of the integrated circuit.

Figure 11:
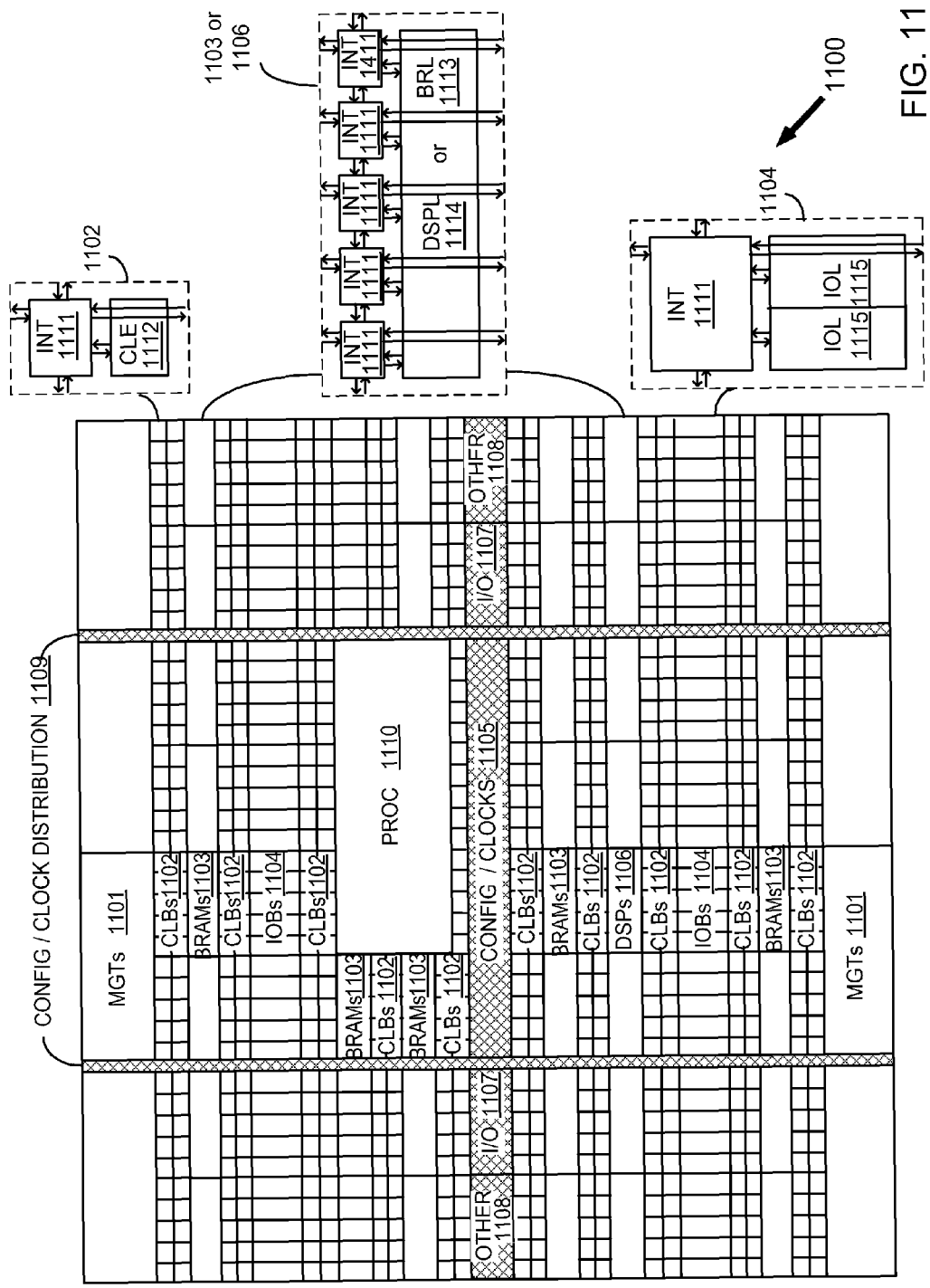
FIG. 11 is a block diagram of a device having programmable resources which may implement the circuits of FIGS. 1-9.

Turning now to FIG. 11, a block diagram of a device having programmable resources including the circuits of FIGS. 1-9 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 11 comprises an FPGA architecture 1100 having a large number of different programmable tiles including multi-gigabit transceivers (MGTs) 1101, CLBs 1102, random access memory blocks (BRAMs) 1103, input/output blocks (IOBs) 1104, configuration and clocking logic (CONFIG/CLOCKS) 1105, digital signal processing blocks (DSPs) 1106, specialized input/output blocks (I/O) 1107 (e.g., configuration ports and clock ports), and other programmable logic 1108 such as digital clock managers, analog-to-digital converters, system monitoring logic, and so forth. Some FPGAs also include dedicated processor blocks (PROC) 1110, which may be used to implement a software application, for example.

In some FPGAs, each programmable tile includes a programmable interconnect element (INT) 1111 having standardized connections to and from a corresponding interconnect element in each adjacent tile. Therefore, the programmable interconnect elements taken together implement the programmable interconnect structure for the illustrated FPGA. The programmable interconnect element 1111 also includes the connections to and from the programmable logic element within the same tile, as shown by the examples included at the top of FIG. 11.

For example, a CLB 1102 may include a configurable logic element (CLE) 1112 that may be programmed to implement user logic plus a single programmable interconnect element 1111. A BRAM 1103 may include a BRAM logic element (BRL) 1113 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 1106 may include a DSP logic element (DSPL) 1114 in addition to an appropriate number of programmable interconnect elements. An IOB 1104 may include, for example, two instances of an input/output logic element (IOL) 1115 in addition to one instance of the programmable interconnect element 1111. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 1109 extending from this column are used to distribute the clocks and configuration signals across the breadth of the FPGA. Some FPGAs utilizing the architecture illustrated in FIG. 11 include additional logic blocks that disrupt the regular columnar structure making up a large part of the FPGA. The additional logic blocks may be programmable blocks and/or dedicated logic. For example, the processor block PROC 1110 shown in FIG. 11 spans several columns of CLBs and BRAMs.

Note that FIG. 11 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 11 are purely exemplary. For example, in an actual FPGA more than one adjacent column of CLBs is typically included wherever the CLBs appear in order to facilitate the efficient implementation of user logic. While the embodiment of FIG. 11 relates to an integrated circuit having programmable resources, it should be understood that the circuits and methods set forth in more detail below could be implemented in any type of ASIC.

Figure 12:
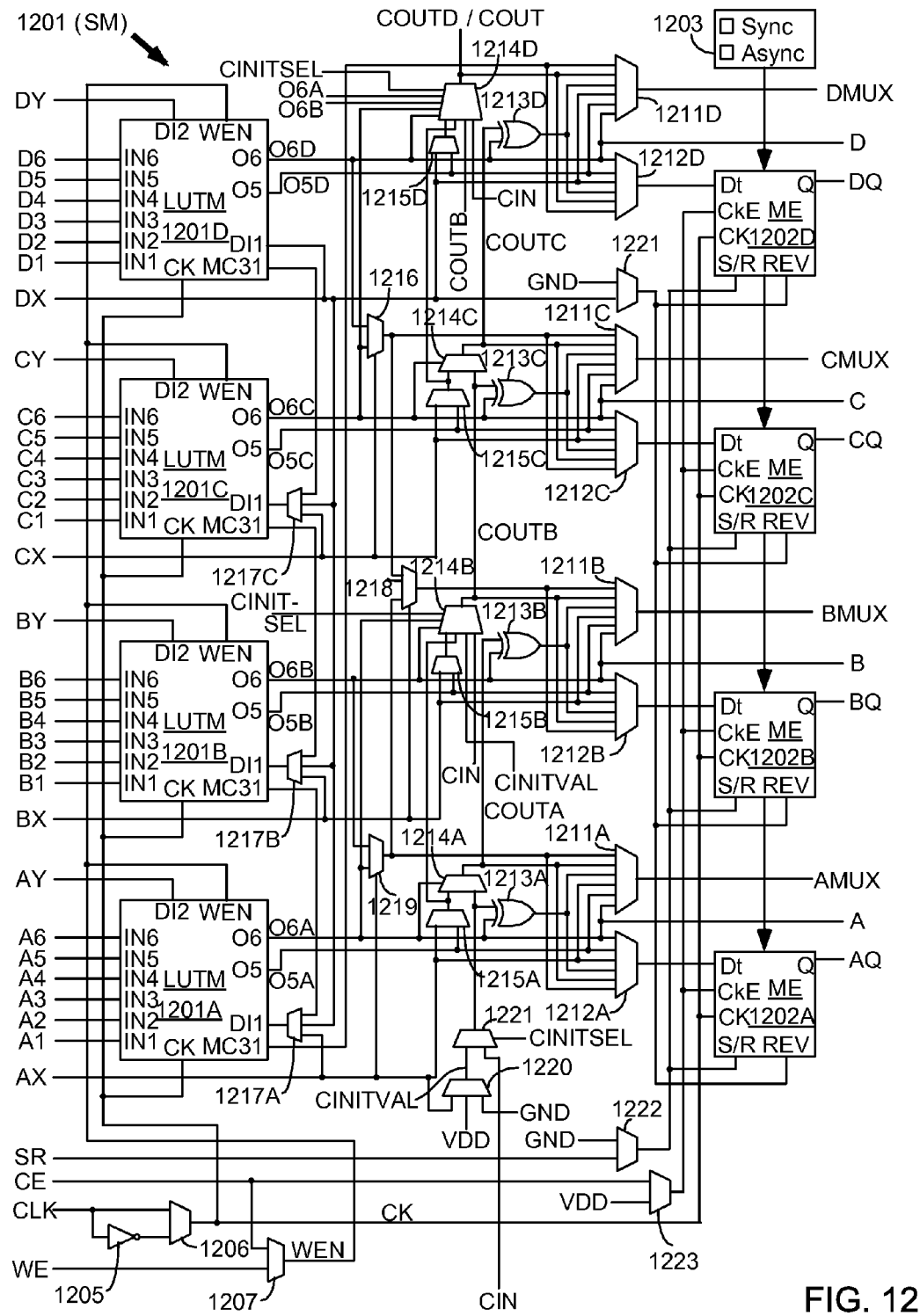
FIG. 12 is a block diagram of a configurable logic element of the device of FIG. 11.

Turning now to FIG. 12, block diagram of a configurable logic element of the device of FIG. 11 is shown. In particular, FIG. 12 illustrates in simplified form a configurable logic element of a configuration logic block 1102 of FIG. 11. In the embodiment of FIG. 12, slice M 1201 includes four lookup tables (LUTMs) 1201A-1201D, each driven by six LUT data input terminals A1-A6, B1-B6, C1-C6, and D1-D6 and each providing two LUT output signals O5 and O6. The O6 output terminals from LUTs 1201A-1201D drive slice output terminals A-D, respectively. The LUT data input signals are supplied by the FPGA interconnect structure via input multiplexers, which may be implemented by programmable interconnect element 1211, and the LUT output signals are also supplied to the interconnect structure. Slice M also includes: output select multiplexers 1211A-1211D driving output terminals AMUX-DMUX; multiplexers 1212A-1212D driving the data input terminals of memory elements 1202A-1202D; combinational multiplexers 1216, 1218, and 1219; bounce multiplexer circuits 1222-1223; a circuit represented by inverter 1205 and multiplexer 1206 (which together provide an optional inversion on the input clock path); and carry logic having multiplexers 1214A-1214D, 1215A-1215D, 1220-1221 and exclusive OR gates 1213A-1213D. All of these elements are coupled together as shown in FIG. 12. Where select inputs are not shown for the multiplexers illustrated in FIG. 12, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 12 for clarity, as well as from other selected figures herein.

In the pictured embodiment, each memory element 1202A-1202D may be programmed to function as a synchronous or asynchronous flip-flop or latch. The selection between synchronous and asynchronous functionality is made for all four memory elements in a slice by programming Sync/Asynch selection circuit 1203. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1202A-1202D are clocked by a clock signal CK, which may be provided by a global clock network or by the interconnect structure, for example. Such programmable memory elements are well known in the art of FPGA design. Each memory element 1202A-1202D provides a registered output signal AQ-DQ to the interconnect structure. Because each LUT 1201A-1201D provides two output signals, O5 and O6, the LUT may be configured to function as two 5-input LUTs with five shared input signals (IN1-IN5), or as one 6-input LUT having input signals IN1-IN6.

In the embodiment of FIG. 12, each LUTM 1201A-1201D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1217A-1217C for LUTs 1201A-1201C), or to the two 32-bit RAMs via input terminals DI1 and DI2. RAM write operations in the LUT RAMs are controlled by clock signal CK from multiplexer 1206 and by write enable signal WEN from multiplexer 1207, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1201A may also be provided to the general interconnect structure for shift register chaining, via output select multiplexer 1211D and CLE output terminal DMUX. Accordingly, the circuits and methods set forth above may be implemented in a device such as the devices of FIGS. 12 and 12, or any other suitable device.

Figure 13:
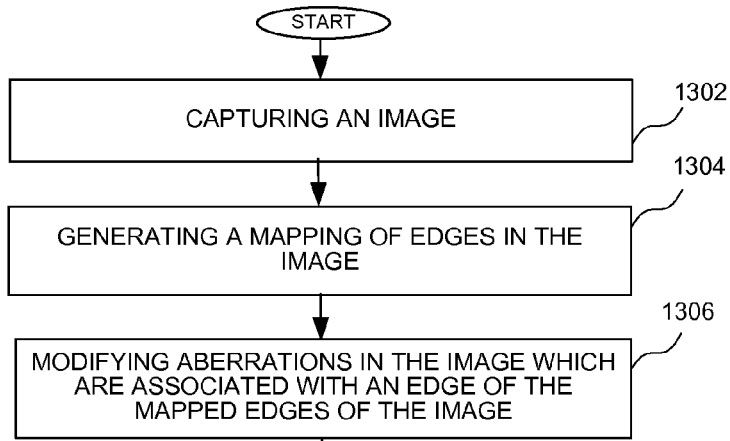
FIG. 13 is a flow chart showing a method of generating a digital image.

Turning now to FIG. 13, a flow chart shows a method of generating a digital image. In particular, an image is captured at a block 1302, and a mapping of edges in the image is generated at a block 1304. Aberrations associated with the image are modified at a block 1306 based upon edges determined by the edge mapping. That is, edge enhancement is performed on the edges, and noise reduction is performed on the entire image, where blurring is avoided across an edge as described above. Edge enhancement will be described in more detail in reference to FIG. 14, while noise reduction will be provided in more detail in reference to FIG. 15.

Figure 14:
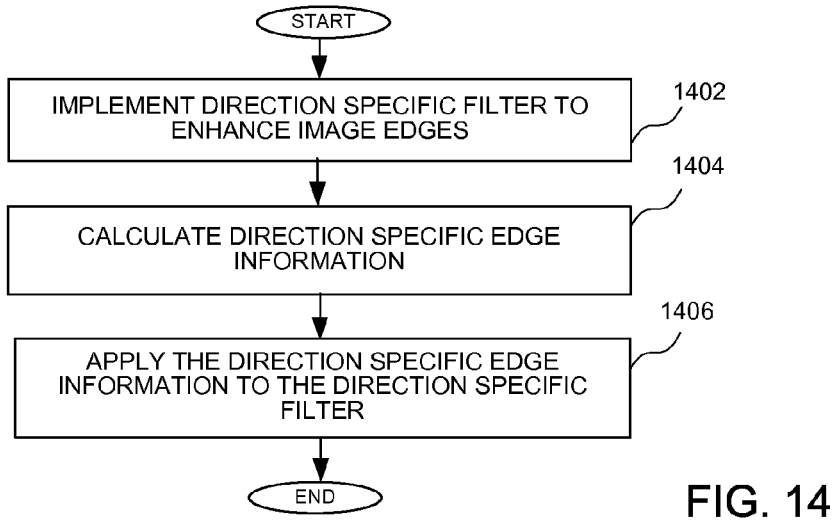
FIG. 14 is a flow chart showing modifying aberrations in an image of the method of FIG. 13 by providing edge enhancement.

Turning now to FIG. 14, a flow chart shows modifying aberrations in an image of the method of FIG. 13 by providing edge enhancement. Direction specific filter to enhance image edges are implemented at a block 1402. Direction specific edge information is calculated at a block 1404. The direction specific edge information is applied to the direction specific filter at a block 1406. Edge enhance may be implemented according to the circuit of FIG. 7 for example, or using some other suitable circuit.

Figure 15:
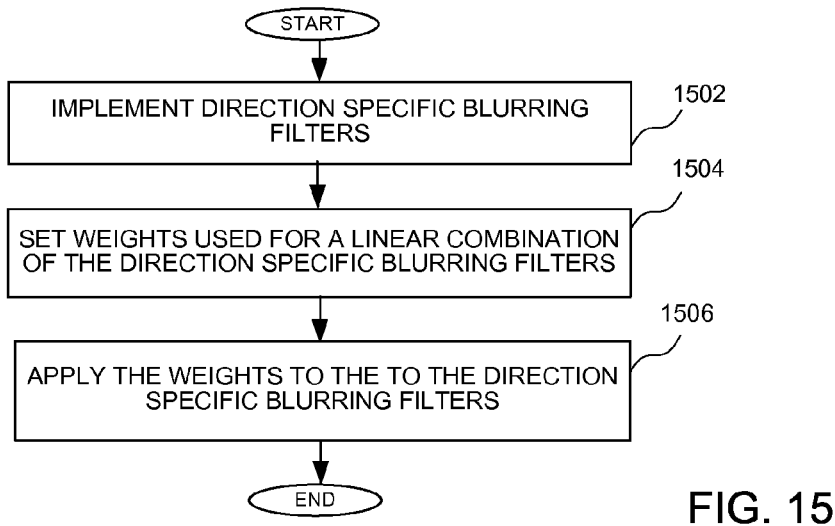
FIG. 15 is a flow chart showing modifying aberrations in an image of the method of FIG. 13 by providing noise reduction.

Turning now to FIG. 15, a flow chart shows modifying aberrations in an image of the method of FIG. 13 by providing noise reduction. Direction specific blurring filters are implemented at a block 1502. Weights used for a linear combination of the direction specific blurring filters are set at a block 1504. The weights are applied to the to the direction specific blurring filters at a block 1506. Noise reduction may be performed according to the circuits of FIGS. 8 and 9 as set forth above, or using some other suitable circuits.

The various elements of the methods of FIGS. 13-15 may be implemented using the circuits of FIGS. 1-12 as described, or using some other suitable circuits. While specific elements of the method are described, it should be understood that additional elements of the method, or additional details related to the elements, could be implemented according to the disclosure of FIGS. 1-12.

It can therefore be appreciated that a new register circuit and method of storing data in a register circuit has been described. It will be appreciated by those skilled in the art that numerous alternatives and equivalents will be seen to exist which incorporate the disclosed invention. As a result, the invention is not to be limited by the foregoing embodiments, but only by the following claims.

We claim:

1. A circuit for generating a digital image, the circuit comprising:
   an image capture circuit;
   an edge mapping circuit coupled to the image capture circuit, the edge mapping circuit generating a mapping of edges in the image;
   an edge enhancement circuit coupled to the edge mapping circuit, the edge enhancement circuit modifying aberrations in the image which are associated with an edge based upon a directional coefficient of a plurality of directional coefficients associated with an edge; and
   a noise reduction circuit coupled to the edge mapping circuit, the noise reduction circuit generating noise reduction coefficients for each of a plurality of pixel orientations;
   wherein the noise reduction circuit comprises a plurality of blurring filters coupled to receive a corresponding noise reduction coefficient, the plurality of blurring filters modifying pixels in the image.

2. The circuit of claim 1, wherein the edge mapping circuit comprises a plurality of directional filters, each directional filter of the plurality of directional filters generating a directional coefficient of the plurality of directional coefficients for each of the plurality of pixels orientations.

3. The circuit of claim 1, wherein the edge enhancement circuit further comprises a plurality of filtering circuits each coupled to receive a directional coefficient for each of the plurality of pixels orientations.

4. The circuit of claim 1, wherein the noise reduction circuit calculates, for each pixel of the image, a variance that is used to determine whether the pixel is associated with an edge.

5. The circuit of claim 4, wherein the noise reduction coefficients are used to reduce blurring across an edge.

6. The circuit of claim 1, further comprising an anti-halo circuit coupled to recover image data which is modified based upon an output of the edge enhancement circuit, wherein the anti-halo circuit reduces overshoot and undershoot artifacts.

7. The circuit of claim 6, further comprising an anti-aliasing circuit coupled to an output of the anti-halo circuit, wherein the anti-aliasing circuit reduces aliasing effects.

8. A circuit for generating a digital image, the circuit comprising:
   an image capture circuit;
   an edge mapping circuit coupled to the image capture circuit, the edge mapping circuit generating a mapping of edges in the image;
   an edge enhancement circuit coupled to the edge mapping circuit, the edge enhancement circuit modifying aberrations in the image which are associated with an edge based upon a directional coefficient of a plurality of directional coefficients associated with the edge; and
   a noise reduction circuit coupled to the edge mapping circuit, the noise reduction circuit modifying aberrations in the image;
   wherein the edge mapping circuit comprises a first plurality of directional filters, each directional filter of the first plurality of directional filters generating a directional coefficient of the plurality of directional coefficients for each of a plurality of pixels orientations; and
   wherein the edge enhancement comprises a second plurality of directional filters each coupled to receive a directional coefficient of the plurality of directional coefficients for each of the plurality of pixels orientations.

9. The circuit of claim 8, wherein the edge enhancement circuit is coupled in parallel with the noise reduction circuit.

10. The circuit of claim 8, wherein the edge enhancement circuit is coupled in series with the noise reduction circuit.

11. The circuit of claim 8, wherein:
   the noise reduction circuit generates noise reduction coefficients for each of the plurality of pixel orientations, wherein the noise reduction coefficients are used to reduce blurring across an edge.

12. The circuit of claim 8, wherein the noise reduction circuit comprises a plurality of blurring filters coupled to receive a corresponding noise reduction coefficient, the plurality of blurring filters modifying pixels in the image.

13. The circuit of claim 8, further comprising an anti-halo circuit coupled to recover image data which is modified based upon an output of the edge enhancement circuit, wherein the anti-halo circuit reduces overshoot and undershoot artifacts.

14. The circuit of claim 13, further comprising an anti-aliasing circuit coupled to an output of the anti-halo circuit, wherein the anti-aliasing circuit reduces aliasing effects.

15. A method of generating a digital image, the method comprising:
   capturing an image;
   generating a mapping of edges in the image;
   modifying aberrations in the image which are associated with an edge of the mapped edges of the image based upon a plurality of directional coefficients associated with the edge;
   generating noise reduction coefficients for each of a plurality of pixel orientations; and
   coupling the noise reduction coefficients to a plurality of corresponding blurring filters, the plurality of corresponding blurring filters modifying pixels in the image.

16. The method of claim 15, wherein generating a mapping of edges further comprises generating a directional coefficient of the plurality of directional coefficients for each of a plurality of pixels orientations.

17. The method of claim 15, further comprising calculating, for each pixel of the image, a variance that is used to determine whether the pixel is associated with an edge.

18. The method of claim 17, further comprising using the noise reduction coefficients to reduce blurring across the edge.

19. The method of claim 15, further comprising reducing overshoot and undershoot artifacts.

20. The method of claim 15, further comprising reducing aliasing effects.

* * * * *